(12) United States Patent
Gustafson et al.

(10) Patent No.: US 7,154,566 B2
(45) Date of Patent: Dec. 26, 2006

(54) PROGRAMMABLE UNIVERSAL REMOTE CONTROL UNIT AND METHOD OF PROGRAMMING SAME

(75) Inventors: David Gustafson, Gilbert, AZ (US); Eugene W. Griesau, Albany, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 548 days.

(21) Appl. No.: 10/310,367

(22) Filed: Dec. 5, 2002

(65) Prior Publication Data

US 2004/0120716 A1 Jun. 24, 2004

(51) Int. Cl.
*H04N 5/44* (2006.01)
*H04L 17/02* (2006.01)
*G08C 19/00* (2006.01)

(52) U.S. Cl. .................. 348/734; 341/176; 340/825.75
(58) Field of Classification Search ................ 348/734, 348/552, 569; 725/80, 81; 398/112; 341/176; 340/825.69, 825.72, 825.22, 825.73, 825.75; 710/8, 65, 67
See application file for complete search history.

(56) References Cited

U.S. PATENT DOCUMENTS

| | | | |
|---|---|---|---|
| 4,251,812 A | | 2/1981 | Okada et al. |
| 4,703,359 A | * | 10/1987 | Rumbolt et al. ............. 348/734 |
| 4,774,511 A | | 9/1988 | Rumbolt et al. |
| 4,825,200 A | | 4/1989 | Evans et al. |
| 4,856,081 A | | 8/1989 | Smith |
| 4,866,434 A | | 9/1989 | Keenan |
| 4,999,622 A | | 3/1991 | Amano et al. |
| 5,020,139 A | | 5/1991 | Keenan |
| 5,182,551 A | * | 1/1993 | Goto .................... 340/825.24 |
| 5,187,469 A | | 2/1993 | Evans et al. |
| 5,307,173 A | | 4/1994 | Yuen et al. |
| 5,317,403 A | | 5/1994 | Keenan |
| 5,414,426 A | | 5/1995 | O'Donnell et al. |
| 5,451,953 A | | 9/1995 | Duffield |
| 5,608,389 A | | 3/1997 | Matsuzawa |
| 5,614,906 A | * | 3/1997 | Hayes et al. ................. 341/176 |
| 5,680,115 A | * | 10/1997 | Sim ....................... 340/825.72 |
| 5,819,294 A | * | 10/1998 | Chambers ................... 707/102 |
| RE35,954 E | | 11/1998 | Levine |
| 5,894,276 A | | 4/1999 | Altidor et al. |
| 5,910,784 A | * | 6/1999 | Lai ............................ 341/176 |
| 5,959,751 A | | 9/1999 | Darbee et al. |
| 5,969,774 A | | 10/1999 | Wininger |
| 5,987,213 A | | 11/1999 | Mankovitz et al. |
| 6,008,735 A | * | 12/1999 | Chiloyan et al. ....... 340/825.22 |
| 6,094,239 A | | 7/2000 | Weber |
| 6,107,951 A | | 8/2000 | Katayama et al. |
| 6,127,961 A | | 10/2000 | Stacy et al. |
| 6,130,625 A | | 10/2000 | Harvey |

(Continued)

OTHER PUBLICATIONS

Daniel Tonks, "Remote Control Review", pp. 1-2, 1998-2002; "Remote Control Programming Instructions", pp. 1-2, 1998-2002.

(Continued)

*Primary Examiner*—Victor R. Kostak

(57) ABSTRACT

A universal remote control unit stores signal formatting data which includes an indication of the category of device to which the signal formatting data corresponds. During programming of the universal remote control unit, the user provides a numerical entry which corresponds to the signal formatting data stored in the memory. The universal remote control unit automatically stores the code entered by the user at the appropriate memory location corresponding to the category of device by analyzing the signal format data to which the code corresponds.

18 Claims, 14 Drawing Sheets

U.S. PATENT DOCUMENTS

| | | | |
|---|---|---|---|
| 6,133,847 A * | 10/2000 | Yang | 340/825.22 |
| 6,157,319 A | 12/2000 | Johns et al. | |
| 6,204,796 B1 * | 3/2001 | Chan et al. | 341/176 |
| 6,236,350 B1 | 5/2001 | Andrews | |
| 6,292,230 B1 | 9/2001 | Shui et al. | |
| 6,346,934 B1 | 2/2002 | Wugofski | |
| 6,507,306 B1 * | 1/2003 | Griesau et al. | 341/176 |
| 6,567,011 B1 * | 5/2003 | Young et al. | 340/825.69 |
| 6,597,374 B1 * | 7/2003 | Baker et al. | 715/717 |
| 6,747,568 B1 * | 6/2004 | Teskey | 340/825.72 |
| 6,791,467 B1 * | 9/2004 | Ben-Ze'ev | 340/825.69 |
| 6,938,101 B1 * | 8/2005 | Hayes et al. | 710/5 |
| 6,947,101 B1 * | 9/2005 | Arling | 348/734 |
| 2001/0010503 A1 | 8/2001 | Darbee et al. | |
| 2001/0024566 A1 | 9/2001 | Mankovitz | |
| 2002/0024517 A1 | 2/2002 | Kwon | |
| 2002/0053981 A1 | 5/2002 | Van Ryzin | |
| 2002/0163440 A1 * | 11/2002 | Tsui | 340/825.69 |
| 2003/0189509 A1 * | 10/2003 | Hayes et al. | 341/176 |
| 2003/0193519 A1 * | 10/2003 | Hayes et al. | 345/721 |
| 2003/0227407 A1 * | 12/2003 | Yuen | 341/176 |
| 2004/0128137 A1 * | 7/2004 | Bush et al. | 704/275 |
| 2004/0208588 A1 * | 10/2004 | Colmenarez et al. | 398/115 |

OTHER PUBLICATIONS

Ralph Calabria, Product Review—Marantz RC-2000 Learning Remote Control, Jun. 1997; pp. 1-2; Secrets of Home Theater & High Fidelity.

* cited by examiner

| Record Length |
|---|
| Protocol Type |
| Device Type |
| On |
| Off |
| 0 - 9 |
| Ch + |
| CH - |
| Vol + |
| Vol - |
| Mute |
| . . . |
| End Of Record |

| Record Length |
|---|
| Protocol Type |
| Device Type |
| Alternate Device Type |
| On |
| Off |
| 0 - 9 |
| Ch + |
| CH - |
| Vol + |
| Vol - |
| Mute |

.
.
.

| End Of Record |
|---|

PROGRAMMABLE UNIVERSAL REMOTE CONTROL UNIT AND METHOD OF PROGRAMMING SAME

FIELD OF THE INVENTION

The present invention relates generally to a remote control unit for remotely controlling a plurality of devices in which signal formatting data is stored in the remote control unit, and to a method of programming a remote control unit to control the plurality of devices.

BACKGROUND INFORMATION

Remote control units have gained widespread popularity for use in remotely controlling home entertainment systems, which typically include devices such as televisions, cable set-top boxes or converters, videocassette recorders (VCR), digital video disk (DVD) players/recorders and stereos. Typically each device includes a separate remote control unit, which is provided by the manufacturer of the device, for remotely controlling the specific device. This causes the home entertainment system user to have many remote control units. This is very cumbersome and may lead to confusion for the user.

In order to eliminate the need for multiple remote control units, universal remote control units have been developed. The universal remote control unit has a plurality of operating modes for controlling a plurality of devices. Each operating mode enables the user to remotely control a corresponding device. Typically, the universal remote control unit includes a plurality of mode push buttons (e.g., CABLE, TV, and VCR push buttons) which correspond to the different devices to be controlled. The mode push buttons are used to directly change the operating mode of a corresponding device. In order for the universal remote control unit to operate each of the different devices, the remote control unit must be programmed to send a signal which is recognized only by the selected device, to obtain an appropriate response from the device.

Typically, universal remote control units include a memory which stores signal formatting data of different manufacturers which identify the signal structure to which specific manufacturer and model number devices are responsive. These signal formatting data commonly vary based on the device which is to be controlled. Programming the universal remote control unit involves identifying signal formatting data that is stored in the memory which the device to be controlled is responsive.

Traditional methods for programming a universal remote control unit which have the afore-mentioned signal formatting data previously stored in memory involve selecting a specific category (e.g., television, cable set-top box or converter, video device or audio device) with which the remote control unit is to be programmed to operate, and then identifying the signal formatting data which is to be associated with the selected category. U.S. Pat. No. 5,872,562 (McConnell et al) teach one such programming method. In McConnell et al the user first activates an entry initiate key and then selects a key signifying a particular category of device to be controlled. Thereafter, the user enters a code indicative of an address in the memory which stores the specific signal formatting data. This data is read out and applied to a microprocessor which, in turn, controls the transmission of signals which are formatted to operate the selected device. The method is repeated for each device which is to be controlled by the remote control unit.

While U.S. Pat. No. 5,872,562 is a usable method, there is a desire to develop simplified programming methods for universal remote control units which do not require the user to select a device category during programming.

U.S. Pat. No. 6,344,817 (Verzulli) describes a method for displaying manufacturer/model codes programmed into a universal remote control unit. While Verzulli makes no mention of selecting a device category in a universal remote control unit, if the Verzulli method was applied to such a remote control, some way of associating a device category key with a particular signal format must be provided. While this is not the subject matter claimed by Verzulli, one skilled in the art would understand that this is done using known methods, such as for example, in a manner similar to that described in McConnell et al., e.g., by, in the programming process, first pressing a key to select a category.

SUMMARY OF THE INVENTION

It is therefore an object of the present invention to provide a universal remote control unit having signal formatting data stored therein and a method of programming the universal remote control unit which does not require user actuation of a category select button during programming and which is capable of concurrently controlling a plurality of devices.

In accordance with one form of the present invention, a method of programming a universal remote control unit includes the steps of initiating, by a user, a programming mode; entering, by a user, a code associated with a device to be controlled by the remote control unit; identifying from the code, a signal formatting data entry, which includes signal formatting data, stored in a memory device in the remote control unit, which signal formatting data includes data determinative of a device type; and associating a device type in the remote control unit with the signal formatting data entry based upon the device type data, such that when one or more of a device type key associated with a device type is subsequently depressed, subsequent commands sent by the remote control unit have the format specified by the signal formatting data, and when a command key uniquely associated with the device type is depressed, commands sent by the remote control unit have the format specified by the signal formatting data.

In accordance with another form of the present invention, a method of programming a universal control unit includes the steps initiating, by a user, a programming mode; entering, by a user, a code associated with a device to be controlled by the remote control unit; identifying, from the code, a signal formatting data entry, which includes signal formatting data, stored in a memory device in the remote control unit, which signal formatting data includes data determinative of a device type; and signal formatting data entry based upon the device type data.

In accordance with yet another form of the present invention, a universal remote control unit for remotely controlling a plurality of devices, each having at least one of a plurality of types, includes a memory; a plurality of signal formatting data entries stored at respective locations in the memory, each entry comprising type information identifying a type of device and signal format information specifying signal formats of commands for controlling at least one of the plurality of devices of that type; a transmitter; input means; and a processor capable of accessing the signal formatting data entries in the memory and capable of controlling the transmitter to transmit signals in conformance with the signal format information in the signal formatting data entries in response to actuation of the input means.

The above and other objects, features and advantages of the present invention will become readily apparent from the following detailed description thereof, which is to be read in connection with the accompanying drawings.

BRIEF DESCRIPTION OF THE DRAWINGS

FIG. 3 is a diagram showing the contents of one signal formatting data entry for controlling a televison, which includes the device type, stored in the memory of the remote control unit;

FIG. 9 is a diagram showing an alternative embodiment of the contents of one signal formatting data entry for controlling a televison, which includes an alternative device type stored in the memory of the remote control unit.

DETAILED DESCRIPTION OF THE PREFERRED EMBODIMENT

The present invention is directed to a method for programming a remote control unit and a device which performs the function of remotely controlling a plurality of devices. Specifically, the method is used in conjunction with universal remote control units which transmit signals to remotely control a plurality of devices of different category types. Typically many different signal formats are required to control the different devices. All of the signals formats for the different devices are stored in a memory at respective memory locations (explained in more detail below).

Figure 1:
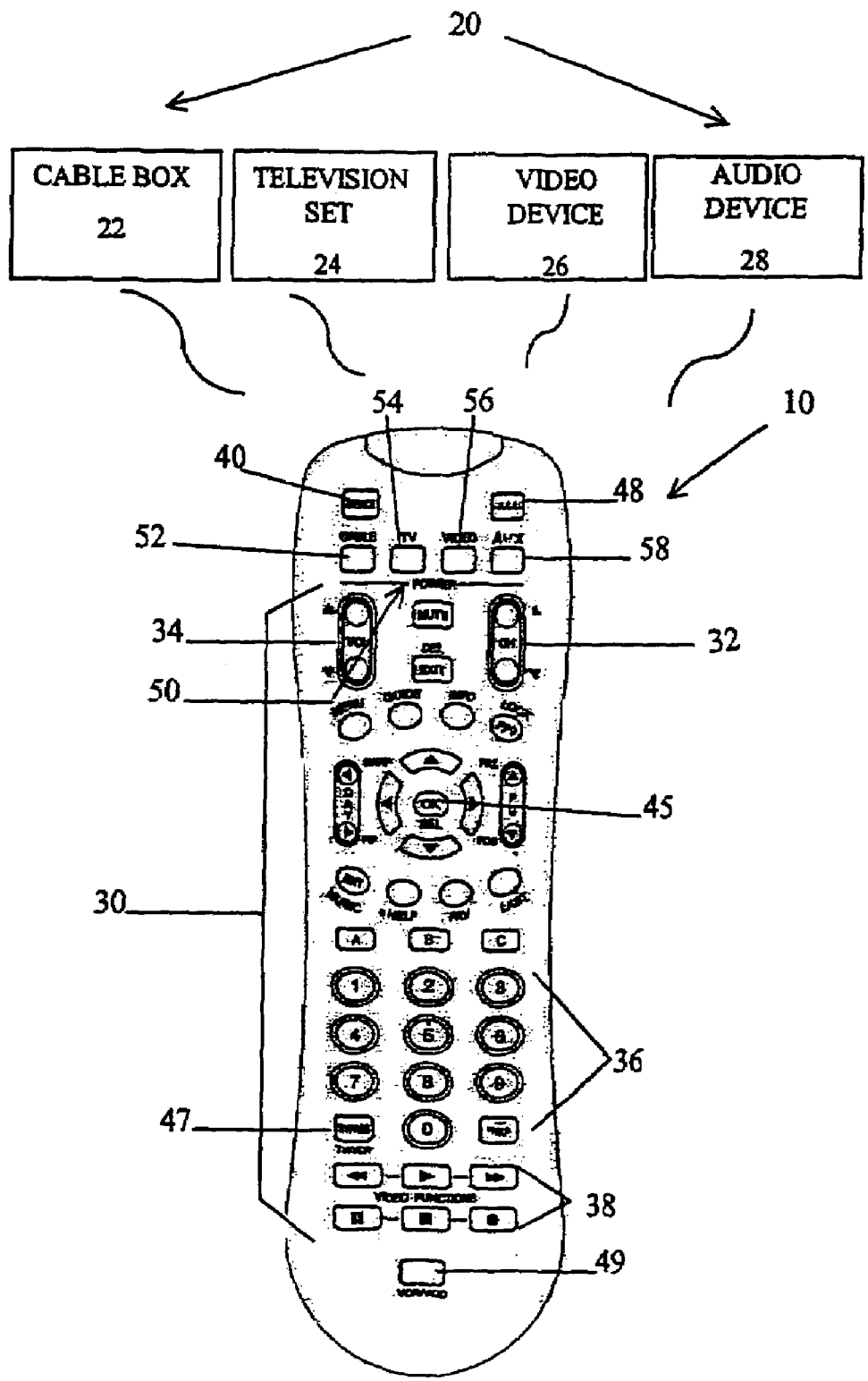
FIG. 1 is front plan view of a universal remote control unit according to the present invention.

Referring initially to FIG. 1, an exemplary universal remote control unit 10 in accordance with the invention for controlling a plurality of devices 20 is shown. As will be explained below, the universal remote control unit is configured to be programmed so that it controls a plurality of audio/visual devices without requiring, during programming by the user, entry of each category of device to be controlled. This simplifies the programming of the remote control unit for the user.

Examples of the plurality of devices 20 which may be controlled by the universal remote control unit 10 include a cable set-top box or converter 22, a television set 24, a video device 26 such as a videocassette recorder (VCR), a digital video disk (DVD) player, a personal video recorder (PVR), a laser-disk (LD) player, a computer, and an audio device 28 such as an amplifier, surround sound audio system, a digital music converter, or an audio-video receiver.

Universal remote control unit 10 includes an input device (means) 12 (FIG. 2) which may include a keyboard 30 having buttons/keys for enabling a user to select a plurality of functions in connection with the operation of the devices 20. As shown in FIG. 1, keyboard 30 may include a CHANNEL button 32, a VOLUME button 34, a plurality of numbered buttons 36, and a plurality of video function buttons 38.

In addition, input device 12 (FIG. 2) may also include a DEVICE button 40 for initiating a mode change, a SELECT button 45, a bypass button 47, an ALL (power) button 48, a VCR/VOD (video on demand) button 49, and a plurality of power/mode buttons 50 such as a CABLE button 52, a TV button 54, a VIDEO button 56, and an AUDIO button 58 for turning the corresponding device on/off and/or placing universal remote control unit 10 in one of a plurality of operating modes. For example, universal remote control unit 10 in its cable mode operates the functions of the cable box 22. In the television mode, the universal remote control unit operates the functions of television 24. Preferably, each of the plurality of mode push buttons are illuminated by, for example, a light-emitting diode.

Figure 2:
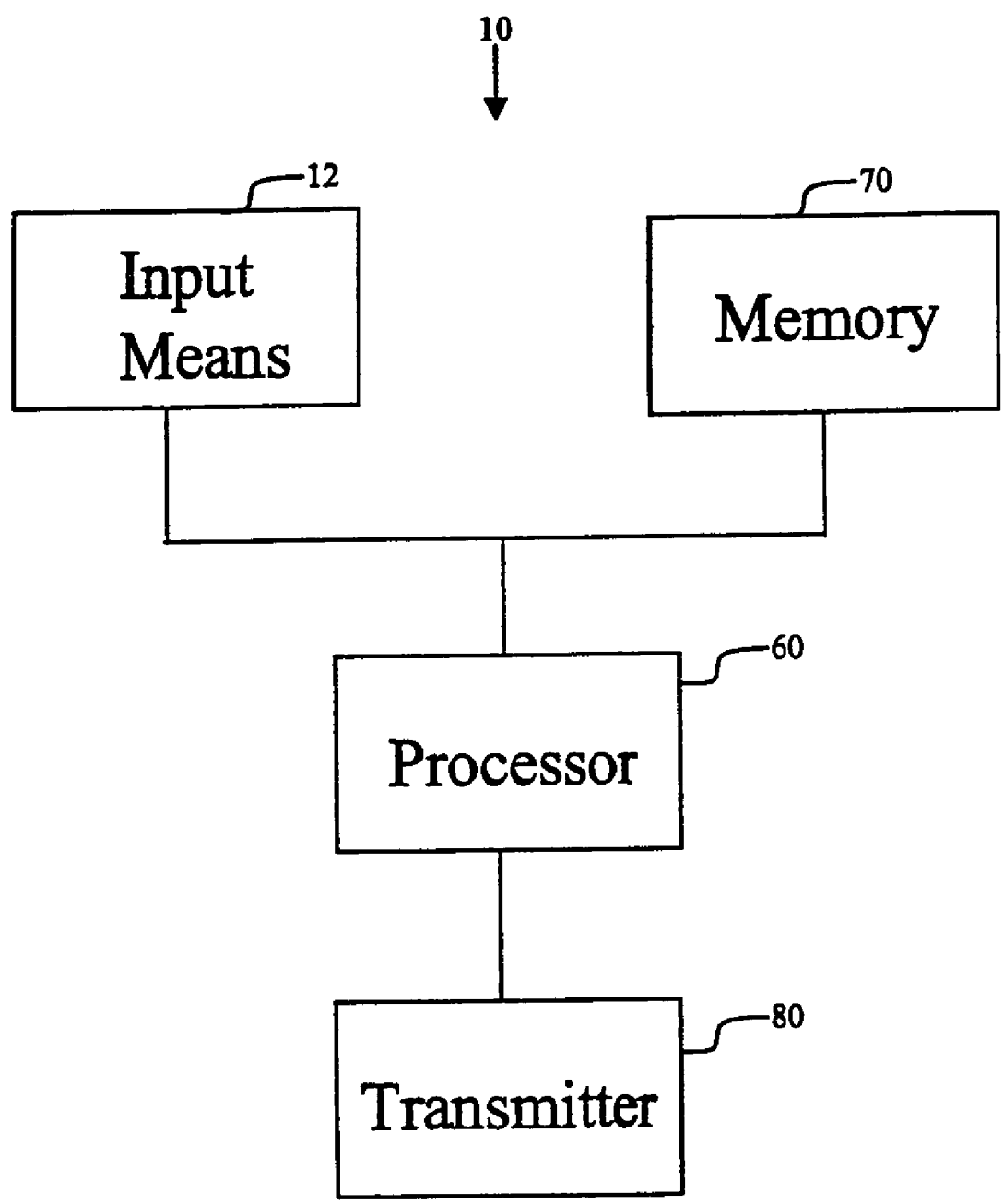
FIG. 2 is a block diagram of the universal remote control unit shown in FIG. 1.

With reference to FIG. 2, universal remote control unit 10 includes, in addition to input means 12, a processor 60, a memory 70 for storing, among other things, a plurality of signal formatting data and user inputs, and a transmitter 80. During use of the remote control unit, and as known in the art, a user first typically selects the type of device to control by activating one of the mode buttons. Thereafter, activation of one or more of the plurality of buttons of keyboard 30 (FIG. 1) generates a command signal. This command signal is supplied to processor 60. In response thereto, processor 60 retrieves an appropriate control code (which may include the signal formatting data) from memory 70 based on prior programming of the unit by the user. Processor 60 then causes transmitter 80 to generate a signal in accordance with the control code retrieved from memory. The signal is received by a corresponding one of the devices 20 (FIG. 1) thereby causing the corresponding device, e.g., cable box 22, television 24, video device 26, or audio device 28, to have the desired response.

Preferably, processor 60 is a programmable infrared (IR) low-voltage micro-controller device such as Part No. GMS344XXXT from LG (Goldstar) Semicon Co., Ltd. of Korea. The processor is run by application software or programming, (e.g., assembly language) and is typically governed by the manufacturer's protocol.

The present invention is not limited to such a processing environment. The present invention can be incorporated and be used within many types of processing environments. From the following description, computer readable program code means for use in processor 60 and for implementing the present invention may be readily programmed by those skilled in the art and stored in memory 70.

The memory 70 may include a ROM (read-only-memory) and a RAM (random access memory). As explained in more detail below, the ROM portion of the memory stores a plurality of signal formatting data which identifies for the processor 60 the configuration of the signal for each device 20 so that when a signal is generated and transmitted, it is recognized by the corresponding device.

Referring to FIG. 3, an exemplary signal formatting data entry for controlling a television set 24 is shown. The signal formatting data entry includes a number of segments, some of which are informational (e.g., record length and device type), and others of which identify the signal configuration which is necessary to obtain a desired response from the television. The signal configuration portions of the signal formatting data include the protocol type, power on, power off, channel entry, channel up, channel down, volume up, volume down, and mute, among others. The signal formatting data need not be stored in the memory in a particular order. That is, the entries need not be stored in groups by manufacturer, category of device, or year of manufacture. Other signal formatting data entries will include signal configuration portions which are specific to the type of device. For example, a signal formatting data entry for a VCR will include, in addition to power on and power off, signal configurations for play, stop, pause, rewind, fast forward, etc.

During programming of the universal remote control unit 10, the user identifies the manufacturer and model number of each device to be controlled by the remote control unit 20. Thereafter, the user locates the manufacturer and model number of a first device in a reference (lookup) table or reference manual provided by the remote control unit manufacturer. The reference table provides a numerical code which corresponds to the manufacturer and model number of the device to be controlled. The numerical code is utilized to derive an address of the ROM of the remote control unit which has stored therein the corresponding signal formatting data for the device. The numerical code is preferably input by the user in the remote control unit via numbered buttons 36. As explained below, if it is determined that the numerical code entered by the user is a valid code, the corresponding ROM address is stored in the RAM portion of the memory. Alternatively, the valid code which is associated with the ROM address can be stored.

The remote control unit determines from the signal formatting data the category of the device associated with the code entered by the user. In particular, in the preferred embodiment, the signal formatting data includes a portion which identifies the category of device (device type, e.g., television, VCR, cable set-top box, etc.). Upon determination of the device type of the signal formatting data, the ROM address which corresponds to the numerical code entered by the user is stored at the appropriate memory location for that particular type of device. Subsequently, when the remote control unit is set to operate that particular type of device, by e.g. actuation of the mode key for that type of deice, and/or upon actuation of buttons/keys on the remote control unit which are uniquely associated with the particular type of device, even without actuation of the mode key, the appropriate signal formatting data will be accessed from the ROM to transmit an appropriate signal to the desired device.

Figure 4A:
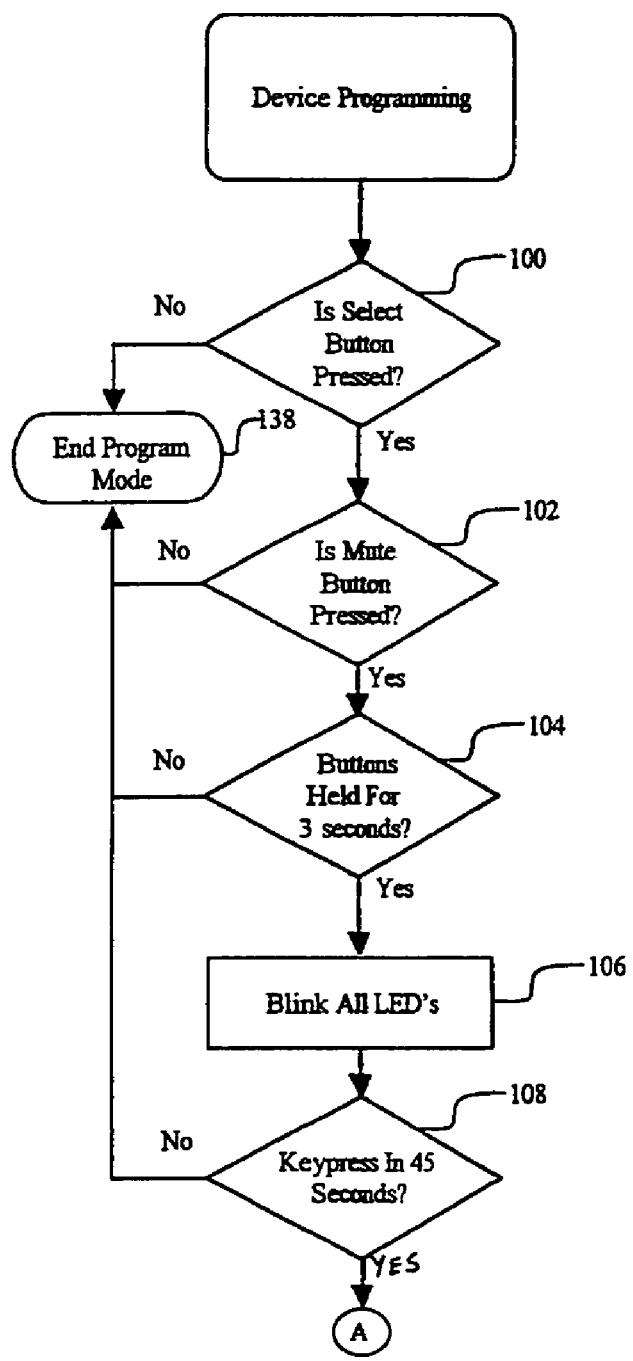
FIG. 4A is a flow chart for programming the remote control unit shown in FIG. 1 to operate a specific device.

Referring now to FIG. 4A, a first method of programming a universal remote control unit to operate a plurality of devices, whether or not manufactured by different manufacturers, without identifying the category of device which is being controlled, will be described.

In order to program the universal remote control device, the user must first enter a programming mode of operation. The programming mode of operation is entered in the illustrated embodiment, when the user concurrently actuates the select and mute bottons for at least three seconds. Referring specifically to FIG. 4A, a determination is made as to whether the select button on the remote control unit is pressed and held (Step 100). If the select button has not been pressed and held (NO in Step 100), the programming mode will not be entered (Step 138) and the remote control unit will return to the normal operating mode. However, if the select button has been pressed and held (YES in Step 100), then a determination is made as to whether the mute button has been pressed and held within a predetermined amount of time (e.g., 5 seconds) after actuation of the select button (Step 102). If the mute button has not been pressed and held within the predetermined period of time (NO in Step 102), then the programming mode is not entered (Step 138). If the mute button has been pressed and held within the predetermined period of time (YES in Step 102), then a determination is made as to whether the select and mute buttons have been concurrently actuated for a predetermined period of time, for example, three seconds (Step 104). If the select and mute buttons have not been concurrently actuated for the predetermined period of time (NO in Step 104), then the programming mode is not entered. If the select and mute buttons have been concurrently held for the predetermined period of time (YES in Step 104), then, in the illustrative embodiment, the light emitting diodes (LED) on the remote control device which correspond to the CABLE button 52, TV button 54, VIDEO button 56 and AUDIO button 58 blink (Step 106). Thereafter, a determination is made as to whether a key is pressed on the remote control unit within a predetermined period of time, e.g., 45 seconds (Step 108). If a key press on the remote control unit does not occur within the predetermined period of time (NO in Step 108), then the programming mode ends (Step 138). If a key press does occur within the predetermined period of time (YES in Step 108), then a determination is made (see FIG. 4B) as to whether the actuated key was one of the numerical keys 36 (Step 110 ).

Figure 4B:
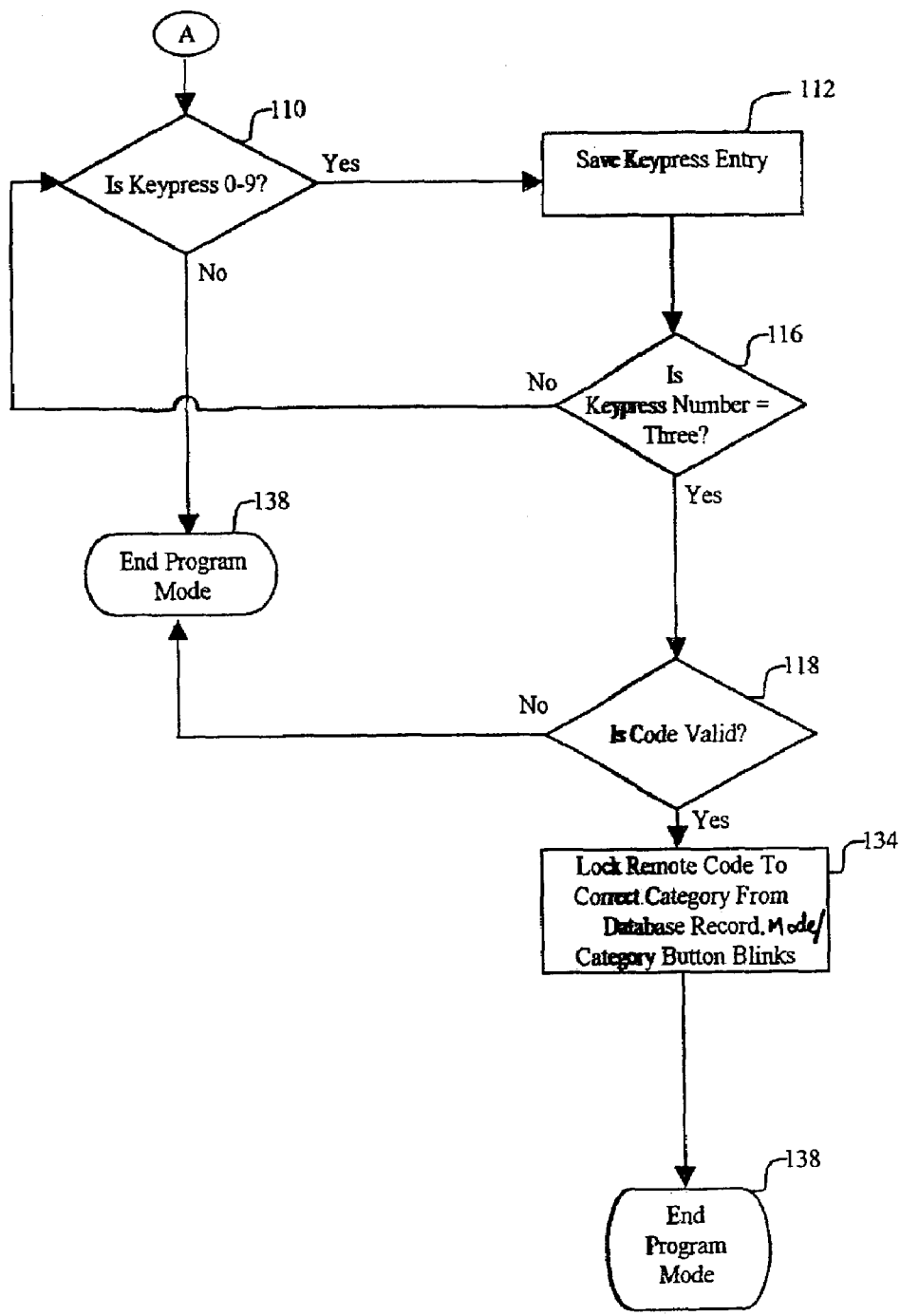
FIG. 4B is continuation of the method of FIG. 4A.

Referring now to FIG. 4B, if the key that was actuated is not a numerical key 36 (NO in Step 110), then the programming mode ends (Step 138). However, if the actuated key is a numerical key (YES in Step 110), then the key entry in Step 108 is temporarily stored in memory (Step 112), and a determination is made as to whether three numerical key presses have been made (Step 116).

If three numerical key presses have not been entered (NO in Step 116), then the next numerical key press is monitored (Step 110) and temporarily stored in memory (Step 112). Upon recognition of three numerical key press entries (YES in Step 116), a determination is made as to whether the three key press entries correspond to a valid code of the universal remote control unit (Step 118). A valid code is determined by deriving the memory address corresponding to the entered numerical code and determining whether it is an address of a valid signal formatting data entry. If it is, the code is valid. Otherwise, the code is invalid.

If the three numerical key presses do not correspond to a valid code (NO in Step 118), then the programming mode ends (Step 138). However, if the three numerical key press entries do correspond to a valid code (YES in Step 118), then the memory address which corresponds to the three digit numerical code is saved in the memory at the memory location corresponding to the category of device (e.g., cable box, video, TV) associated with the specific device formatting data. The corresponding mode button will preferably blink indicating that the programming for the device is complete (Step 134). The programming mode then ends (Step 138).

In order to program the remote to operate a different device, the programming mode must be initiated again by actuating and concurrently holding the select and mute buttons (Steps 100, 102, 104).

Figure 5A:
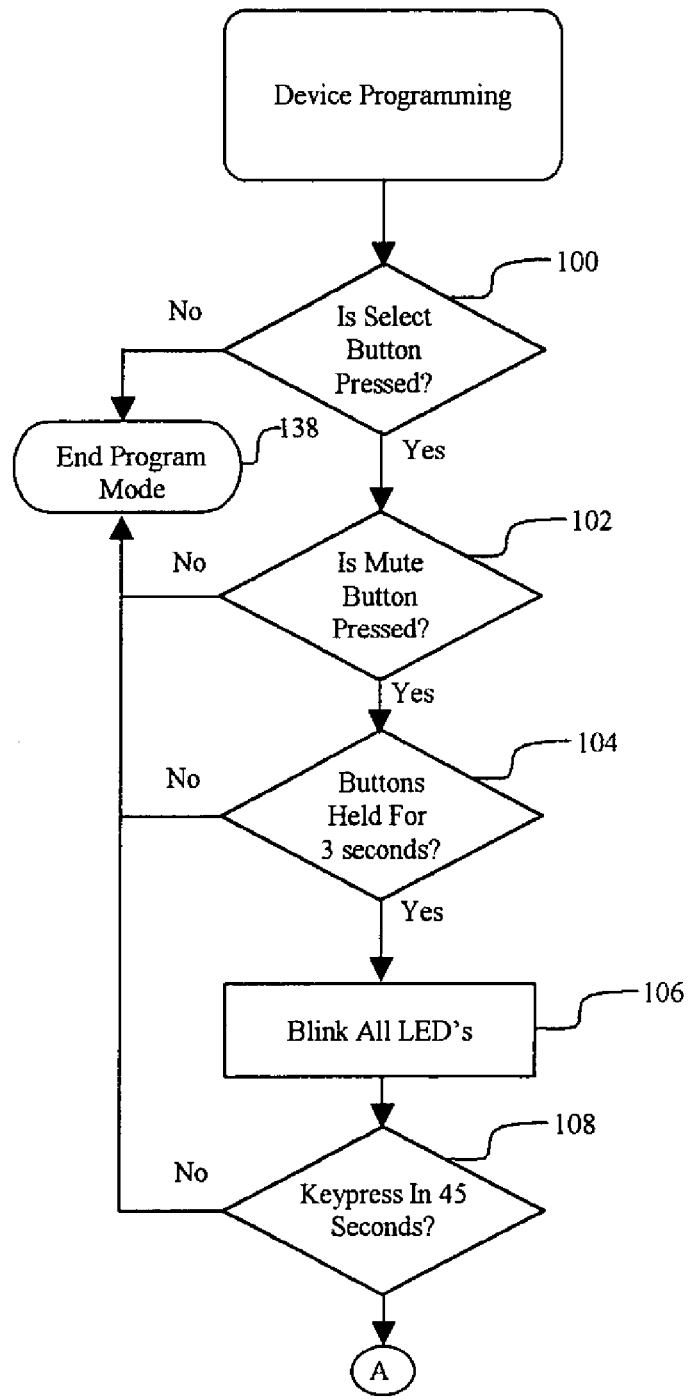
FIG. 5A is a flow chart of an alternative embodiment for programming the remote control unit to operate a specific device.
Figure 5B:
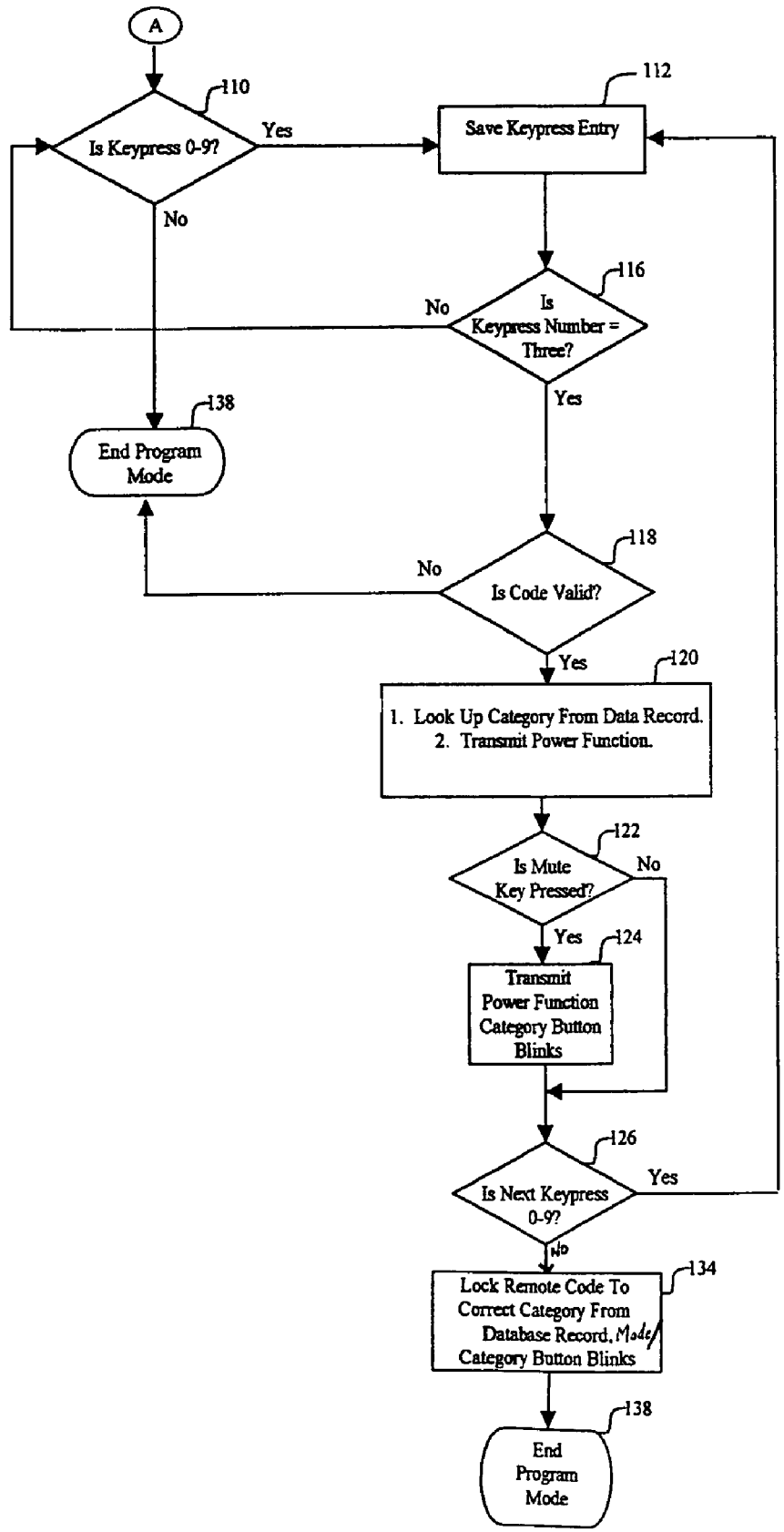
FIG. 5B is a continuation of the method of FIG. 5A.

Referring now to FIGS. 5A and 5B, an alternative embodiment of the present invention is shown. In the alternative embodiment, the method of programming is similar to that described in connection with FIGS. 4A and 4B. However, after determining whether the code is valid in Step 118 (FIG. 5B), the alternative embodiment includes a method for confirming that the valid code corresponds to the memory address of a proper signal formatting data by transmitting a signal from the remote control unit to the corresponding device being controlled. If the device is responsive to the signal transmitted by the remote control unit, this confirms for the user that the numerical code that was entered is not only valid (corresponds to a memory location wherein signal formatting data is stored) but properly operates the device to be controlled.

Referring now to FIG. 5B, if the three numerical key press entries do correspond to a valid code (YES in Step 118), then the device formatting data stored in memory at the address location which corresponds to the valid code is accessed. The signal formatting data is tested to ensure that this information can be used to generate signals which operate the specific device.

Specifically, in this alternative embodiment, the portion of the signal format data corresponding to the power (on/off) function of the device is accessed from the memory. A power on/off signal is generated and transmitted to the corresponding device (Step 120). Thereafter, if the power (on/off) setting of the corresponding device has been switched (i.e., the power for the device was on and is now off, or the power for the device was off and is now on), the user is instructed to press a key (e.g., the mute key) to indicate that the corresponding device has responded to the signal transmitted by the remote control device. If the user has actuated the mute key (YES in Step 122), then another signal is generated using the signal formatting data corresponding to the power (on/off) function of the device to return the device to its previous power (on/off) state (Step 124). In addition, in this alternative embodiment, the mode button (e.g., CABLE button 52, TV button 54, VIDEO button 56 and AUDIO button 58) corresponding to the specific signal formatting data preferably blink once. If the mute button was not pressed (NO in Step 122), the process proceeds to Step 126.

The method next determines whether a key on the numerical keypad has been actuated (Step 126) within a predetermined period of time (e.g., 5 seconds). If a key on the numerical keypad has been actuated (YES in Step 126) within the predetermined period of time, this indicates that the signal formatting data accessed from the memory may not properly correspond to the selected device (i.e., the user did not observe the device turning on/off), and the user is re-entering the code or inputting another code to access the signal formatting data stored in the memory (Steps 110, 112 and 116).

If after Step 124 a next key press is not a numerical key press (NO in Step 126) within the predetermined period of time, then the memory address which corresponds to the three digit numerical code that was entered by the user is saved in the memory at the memory location corresponding to the category of device (e.g., cable box, video, TV) associated with the specific device formatting data. The corresponding mode button will preferably blink three times to indicate that the programming for the device is complete (Step 134). The programming mode then ends (Step 128).

Figure 6A:
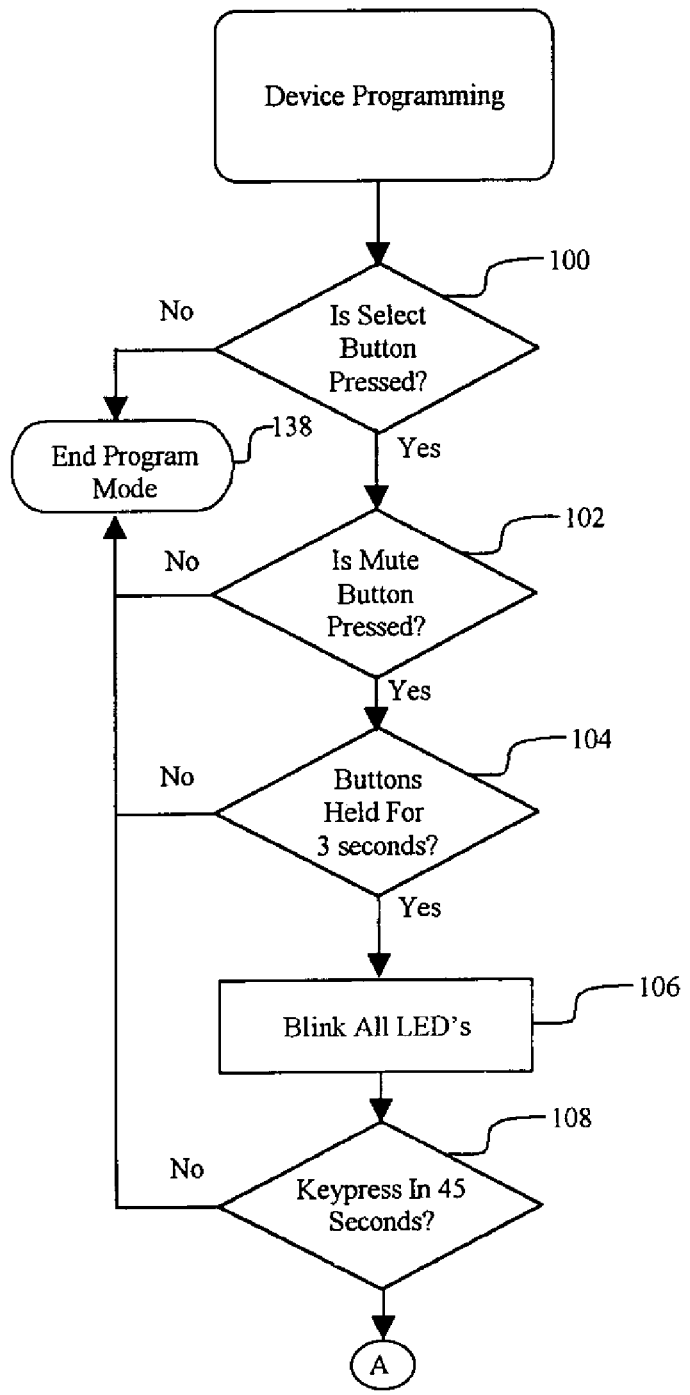
FIG. 6A is a flow chart of an alternative embodiment for programming the remote control unit to operate a specific device.
Figure 6B:
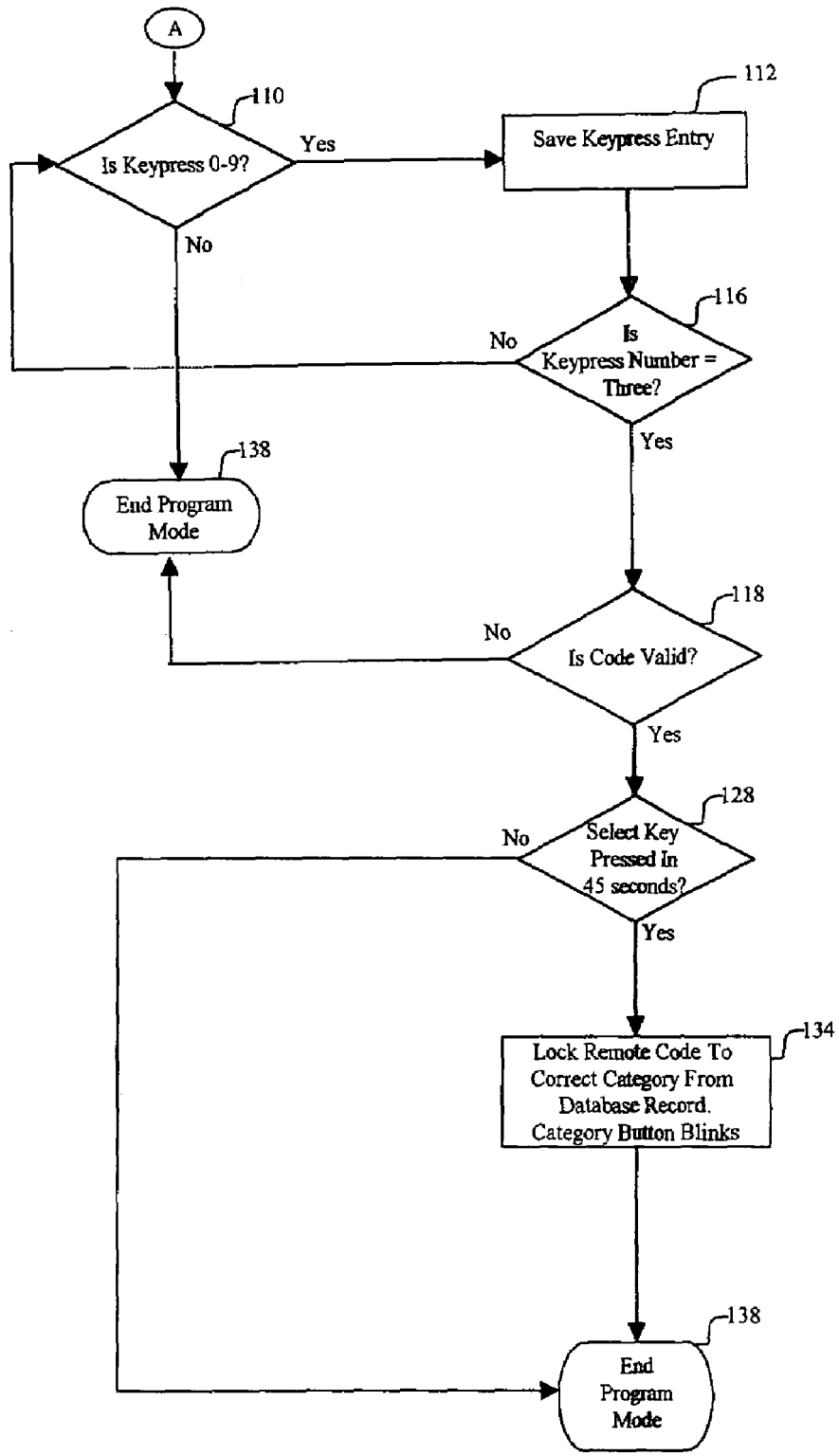
FIG. 6B is a continuation of the method of FIG. 6A.

Referring now to FIGS. 6A and 6B another alternative embodiment of the method of programming a universal remote control unit is shown. In this alternative embodiment, the method of programming is similar to that described above in connection with FIGS. 4A and 4B. However, after determining whether the numerical code entered by the user is valid in Step 118 (FIG. 6B), in this alternative embodiment if the numerical code entered by the user is valid (YES in Step 118), a determination is made as to whether the select key is actuated within a predetermined period of time, e.g., 45 seconds (Step 128). If the select key is not actuated within the predetermined period of time (NO in Step 128), the programming mode ends (Step 138) and the memory address which corresponds to the numerical code entered by the user is not stored in memory. However, if the select key is actuated within the predetermined period of time (YES in Step 128), the memory address which corresponds to the three digit numerical code is saved in the memory at the memory location which corresponds to the category of device (e.g., cable box, video, TV) associated with the specific device formatting data. The corresponding mode button will preferably blink indicating that the programming for the device is complete (Step 134). The programming mode then ends (Step 138).

Figure 7:
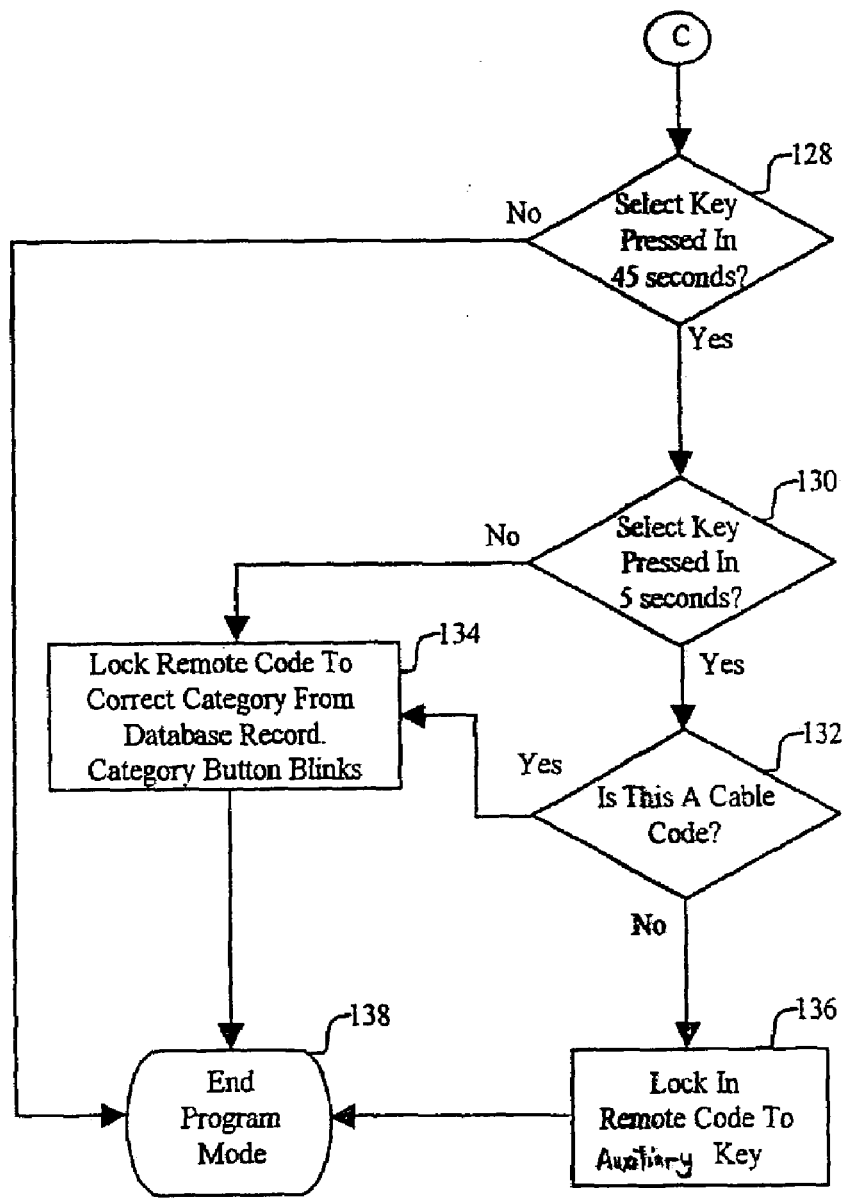
FIG. 7 is a flow chart of an alternative embodiment for programming the remote control unit to operate a specific device.

Referring now to FIG. 7, an alternative embodiment of the method in connection with FIGS. 6A and 6B is shown. In this alternative embodiment, after actuation of the select button in Step 128 (YES in Step 128), a determination is made as to whether the select key is pressed again in a second predetermined period of time, e.g., five seconds (Step 130).

In this alternative embodiment, after the select key is actuated in Step 128, the user is advised, in, e.g. instructional materials provided with the remote control device, to press the select key again within five seconds if the user desires to link the device being programmed to an auxiliary key (not shown in FIG. 1). The user would press the select key a second time in Step 130 if, for example, two devices of the same general device type are to be controlled by the remote control unit. This might occur, for example, if separate VCR and DVD players are to be operated by the remote control unit. One of the devices would be linked to the video button and the other device would be linked to the auxiliary button. While four device power buttons are shown on the remote control unit of FIG. 1, it is foreseen that any number of power buttons could be included.

If the select key is not pressed within the second predetermined period time (NO in Step 130), then the memory address which corresponds to the three digit code that was entered by the user is saved in the memory at the memory location corresponding to the category of device (e.g., cable box, video, TV) associated with the specific device formatting data. The corresponding mode button will preferably blink indicating that the programming for the device is complete (Step 134). The programming mode then ends (Step 138).

If the select key was actuated in the second predetermined period of time (YES in Step 130), then a determination is preferably made as to whether the signal formatting data that was accessed from the memory corresponds to the cable box (Step 132). This is determined by analyzing the portion of the signal formatting data which identifies the type of device. If the signal formatting data does correspond to a cable box (YES in Step 132), the memory address which corresponds to the numerical code entered by the user is stored in the memory location corresponding to the cable box (Step 134). If, however, the signal formatting data does not correspond to a cable box (NO in Step 132), then the memory address which corresponds to the numerical code entered by the user is stored in the memory at a location corresponding to the auxiliary key (Step 136) and the programming mode ends (Step 138).

Figure 8A:
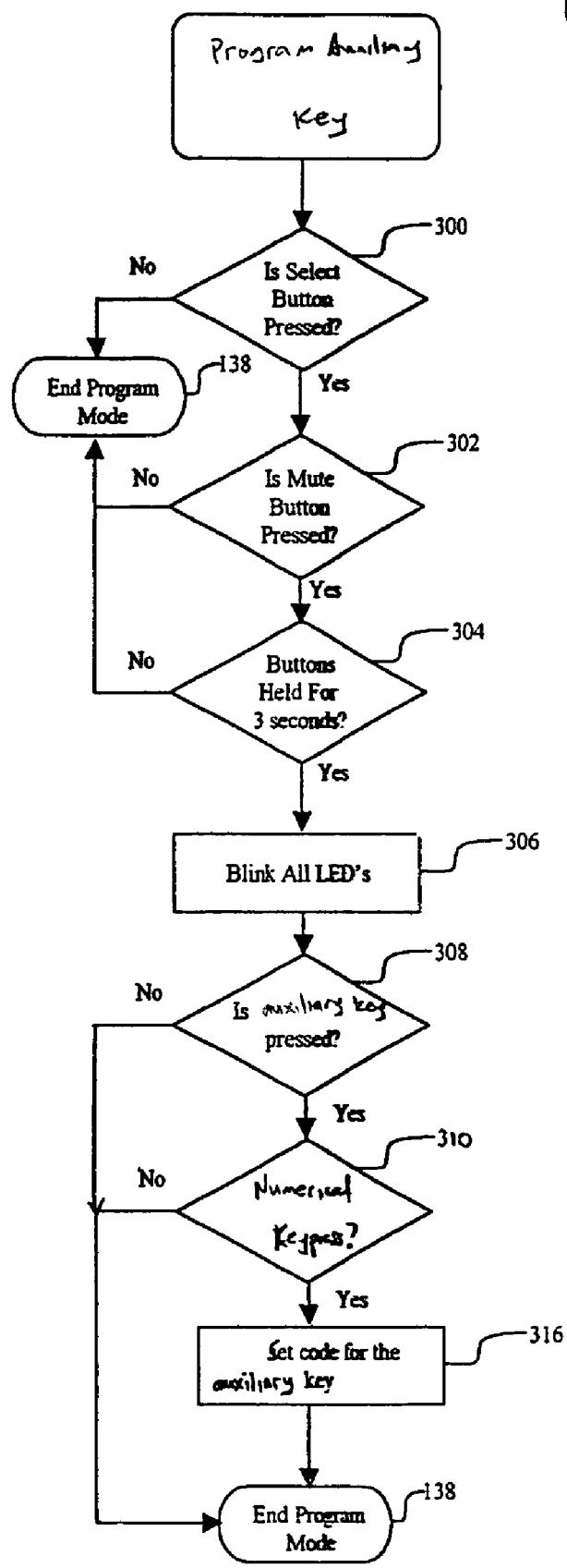
FIG. 8A is a flow chart for programming the auxiliary key to correspond to a specific category of device.
Figure 8B:
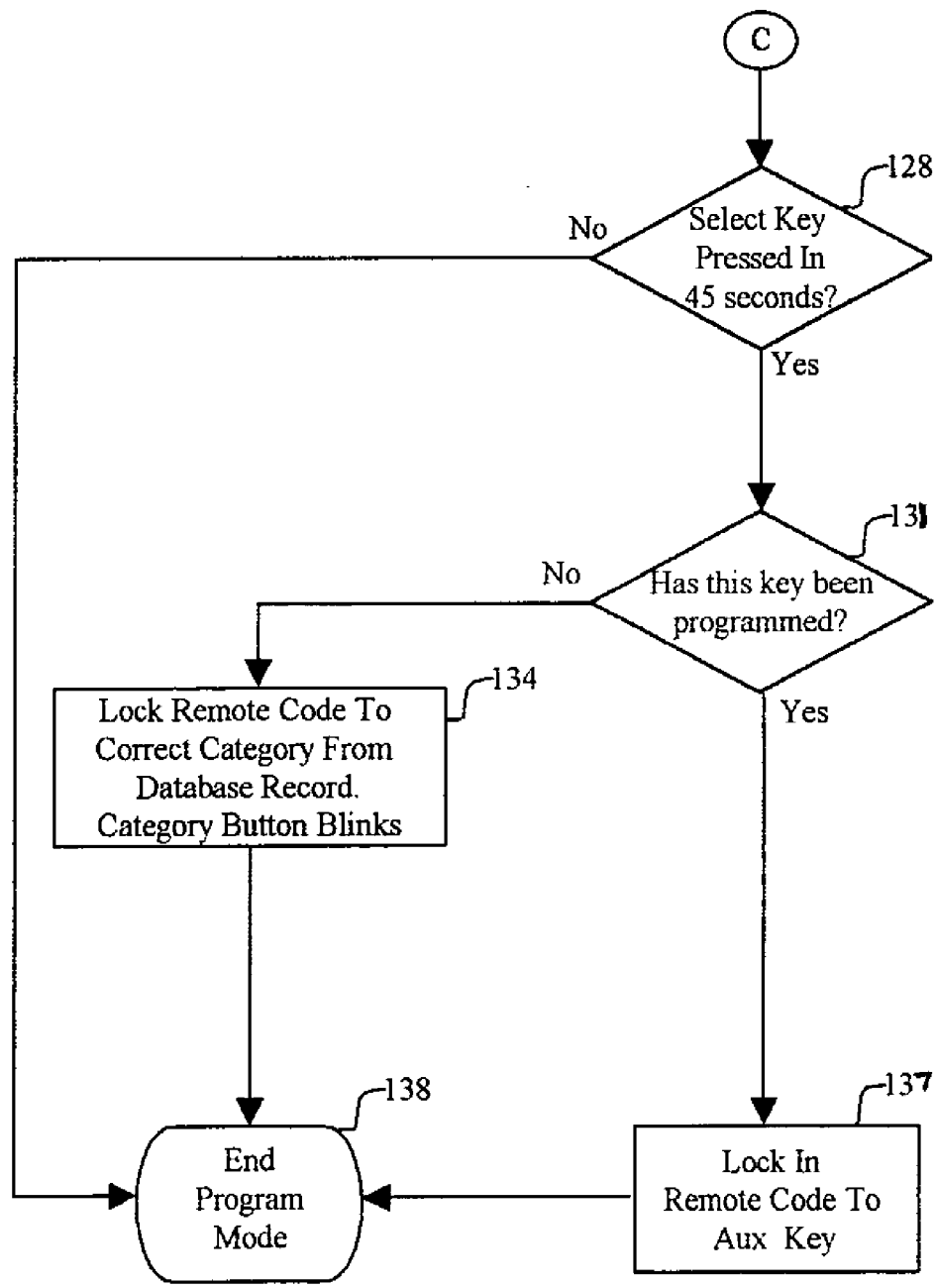
FIG. 8B is a flow chart of an alternative embodiment for programming the remote control unit when the auxiliary key has been programmed.

In accordance with yet another alternative embodiment shown in FIGS. 8A and 8B, the auxiliary key may be programmed, prior to programming the remote control unit to remotely operate a particular device, so as to be associated with only a specific type of device. In this alternative embodiment, the auxiliary key can be programmed by entering the programming mode in accordance with Steps 300, 302, 304, 306 (which are similar to Steps 100, 102, 104 and 106 as previously described) shown in FIG. 8A. After all of the LEDs blink in Step 306, a determination is made as to whether the auxiliary button is pressed. If the auxiliary button is pressed (YES in Step 308), a determination is made as to whether a numerical key entry has been made (Step 310). If a numerical key entry has been made, then the auxiliary button is set to receive data associated with the particular type of device which corresponds to the numerical entry. For example, if the number "1" is entered after depressing the auxiliary key, a TV code may be stored in correspondence with the auxiliary key. Other numerical entries will correspond to different types of devices. Once the auxiliary key is set, the programming mode for the auxiliary key will end (Step 138).

By depressing the "0" key after depressing the auxiliary key in the programming mode, the auxiliary key will be reset and return to its normal un-programmed state.

In this alternative embodiment after the auxiliary key has been programmed to be associated only with a specific type of device, the method of programming the remote control is similar to the previously explained embodiments up to Step 118. That is, after a valid code is determined (YES in Step 118) (as explained in accordance with the prior embodiments) and the select key has been pressed within the predetermined period of time (YES in Step 128) (see FIG. 8B), a determination is made as to whether the particular mode key associated with the current device has been programmed (Step 131) to operate with another device. If the mode key has not been programmed (NO in Step 131), then the memory address which corresponds to the numerical code is stored in correspondence with the category identified in the signal formatting data. Thereafter, the mode button preferably blinks (Step 134) and the program ends (Step 138). If, however, the mode key corresponding to the device type has already been programmed (YES in Step 131), then the memory address which corresponds to the numerical code corresponding to the device to be programmed is stored in memory in correspondence with the auxiliary key (Step 137) if the auxiliary key has been programmed for this type of device, and the program ends (Step 138).

In yet another alternative embodiment of the present invention, the record for each signal formatting data stored in the universal remote control unit includes not only a device type which is the primary mode key with which the device is to be associated, but also an alternative device type which indicates a secondary mode key if the primary device type already has a device associated therewith (see FIG. 9).

Figure 10:
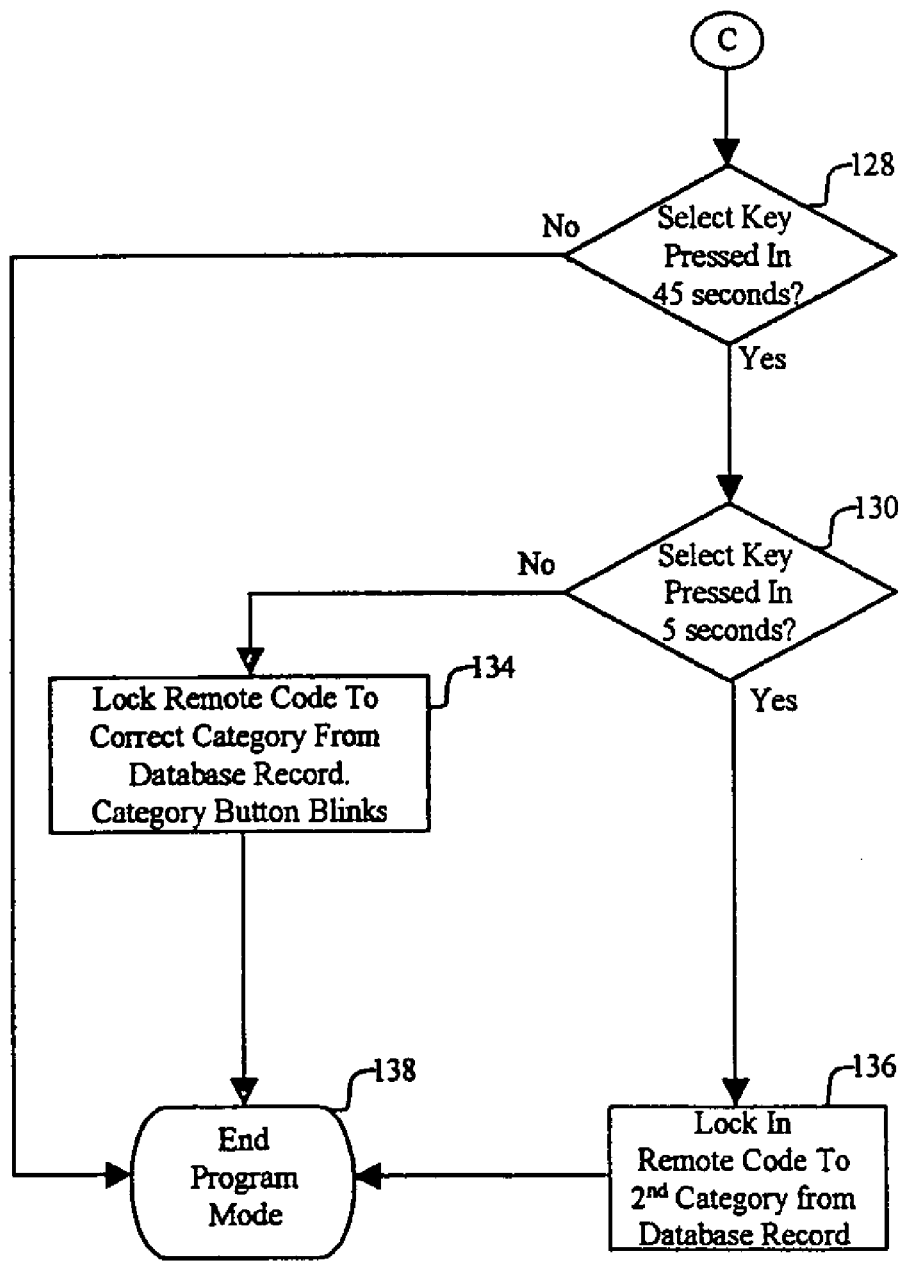
FIG. 10 is a flow chart for programming a universal remote control unit utilizing the alternative device type shown in FIG. 9.

Referring now to FIG. 10, an alternative embodiment of the method described in connection with FIGS. 6A and 6B is shown. In this embodiment, in Step 128, if the select key is pressed in the predetermined time period (YES in Step 128), and the select key is pressed again within five seconds of the first actuation of the select key (YES in Step 130), this indicates to the remote control unit that the memory address which corresponds to the entered numerical code is to be stored in association with the secondary device type stored in the signal formatting data (Step 136) and then the program ends (Step 138). If the select key is not pressed a second time within five seconds of the first actuation of the select key (NO in Step 130), then the memory address which corresponds to the numerical code is stored in association with the primary device type indicated in the signal formatting data record.

As an alternative to this embodiment, Step 130 can be eliminated and replaced with a step which automatically determines whether the mode key associated with the primary device type has already been programmed to be associated with a device. If the mode key which corresponds to the primary device type already has a numerical code associated therewith, then the memory address which corresponds to the numerical code is stored in association with the mode key which corresponds to the alternate (secondary) device type which is indicated in the corresponding record. If the mode key associated with the primary device type does not have a memory address associated therewith, then the memory address which corresponds to the numerical code is stored in association with the primary device type (Step 134) and the program ends (Step 138).

From the present description, it will be appreciated by those skilled in the art that any type of input device, including but not limited to a touch screen or a liquid crystal display having a touch screen, may be used as an input menas, instead of the push buttons, to enable a user to enter the numerical code. In addition, it will be appreciated by those skilled in the art that instead of illuminatable push buttons, one or more light-emitting diodes may be disposed on universal remote control unit to indicate the status of the programming. Further, it will be appreciated that instead of a cable mode key, a digital satellite system receiver key may be provided for controlling such a receiver. As well, a DVD button may be provided for controlling such a device and other buttons may be added to control other types of devices. Moreover, while the memory was described as including ROM and RAM portions, it is foreseen that the memory could include a programmable read-only memory (PROM), an erasable, programmable, read-only memory (EPROM), an electrically erasable, programmable read-only memory (EEPROM) or any other suitable memory configuration to achieve the desired results of the present invention.

Thus, while various embodiments of the present invention have been illustrated and described, it will be appreciated by those skilled in the art that changes and modifications may be made thereunto without departing from the spirit and scope of the invention.

What is claimed is:

1. A method of programming a universal remote control unit comprising the steps of:
   initiating, by a user, a programming mode;
   entering, by a user, a code associated with a device to be controlled by the remote control unit without selecting a device type;
   identifying, from the code, a signal formatting data entry, which includes signal formatting data, stored in a memory device in the remote control unit, which signal formatting data includes data determinative of a device type of a plurality of device types; and
   associating, said device type in the remote control unit with the identified signal formatting data entry based upon the determinative data, such that when one or more of a device type key associated with said device type are subsequently depressed, subsequent commands sent by the remote control unit have a format specified by the signal formatting data, and when a command key uniquely associated with the device type is depressed, commands sent by the remote control unit have a format specified by the signal formatting data.

2. The method of claim 1 further comprising the step of: generating a signal for transmission to the device to be controlled based on signal format information in the identified signal formatting data entry.

3. The method of claim 1 wherein the step of associating comprises:
generating and transmitting a signal to the device to be controlled based on signal format information in the identified signal formatting data entry, said storing being contingent upon said device to be controlled responding to the transmitted signal.

4. The method of claim 1, wherein the device type is one of a cable set-top box, a television, a VCR, DVD, an audio component or a computer.

5. The method of claim 1, wherein the step of associating comprises storing information regarding the identified signal formatting data entry in a memory location associated with the device type key.

6. A method of programming a universal remote control unit comprising the steps of:
initiating, by a user, a programming mode;
entering, by a user, a code associated with a device to be controlled by the remote control unit;
identifying, from the code, a signal formatting data entry, which includes signal formatting data, stored in a memory device in the remote control unit, which signal formatting data includes data determinative of a device type; and
associating a device type in the remote control unit with the signal formatting data entry based upon the device type data.

7. The method of claim 6 further comprising the step of: generating a signal for transmission to the device to be controlled based on signal format information in the identified signal formatting data entry.

8. The method of claim 6 wherein the step of associating comprises storing information regarding the identified signal formatting data entry in a memory location that has been associated particularly with the device type.

9. The method of claim 6 wherein the step of associating comprises: generating and transmitting a signal to the device to be controlled based on signal format information in the identified signal formatting data entry; and
storing information regarding the identified signal formatting data entry in a memory location associated with the device type if the device responds to the transmitted signal.

10. The method of claim 6, wherein the device type as one of a cable set-top box, a television, a VCR, DVD, an audio component or a computer.

11. A universal remote control unit for remotely controlling a plurality of devices, each having at least one of a plurality of types, comprising:
a memory;
a plurality of signal formatting data entries stored at respective locations in the memory, each entry comprising type information identifying a type of device and signal format information specifying signal formats of commands for controlling at least one of the plurality of devices of that type;
a transmitter;
input means; and
a processor capable of accessing the signal formatting data entries in the memory and capable of controlling the transmitter to transmit signals in conformance with the signal format information in the signal formatting data entries in response to actuation of the input means.

12. The universal remote control unit according to claim 11, wherein the input means enables a user to input a code that identifies one of the plurality of signal formatting data entries.

13. The universal remote control unit according to claim 12, wherein the code input by the user can be used to derive a memory location where the identified signal formatting data entry is stored.

14. The universal remote control unit according to claim 12, wherein the memory further stores the code input by the user.

15. The universal remote control unit according to claim 11, wherein the type information comprises one of a cable set-top box, a television, a VCR, a DVD player, a digital video disk player/recorder, an audio component or a computer.

16. The universal remote control unit according to claim 11, wherein the memory comprises a read only memory and a random access memory and the plurality of signal formatting data entries are stored in read only memory and the code input by the user is store in random access memory.

17. The control unit of claim 11, wherein locations of said memory are assigned by said type of device for respectively storing, in response to said actuation, information regarding said entries that are identified in response to said actuation.

18. The control unit of claim 12, wherein the input means enables a user to input a code to determine a device type from one of the plurality of signal formatting data entries without selecting the device type.

* * * * *